United States Patent [19]

Powell et al.

[11] 4,099,597
[45] Jul. 11, 1978

[54] LUBRICATION PUMP

[75] Inventors: John H. Powell, Twinsburg; James J. Callahan, Mentor, both of Ohio

[73] Assignee: Houdaille Industries, Inc., Buffalo, N.Y.

[21] Appl. No.: 716,381

[22] Filed: Aug. 23, 1976

[51] Int. Cl.² ........................ F16N 7/36; F16N 13/14
[52] U.S. Cl. .................... 184/27 B; 417/471
[58] Field of Search ............... 184/27 B, 27 C, 27 A, 184/27 R; 417/470, 471

[56] References Cited

U.S. PATENT DOCUMENTS

| | | | |
|---|---|---|---|
| 1,371,289 | 3/1921 | Wood | 184/27 A |
| 1,556,479 | 10/1925 | Hajek et al. | 184/27 A |
| 1,895,623 | 1/1933 | Hewitt | 417/471 X |
| 1,970,591 | 8/1934 | Barks | 184/27 R X |
| 1,990,408 | 2/1935 | Kerst et al. | 184/27 R X |
| 2,114,565 | 4/1938 | Kovach | 417/539 X |
| 2,710,671 | 6/1955 | Thomas | 184/27 |
| 2,810,457 | 10/1957 | Halliday | 184/27 R X |
| 3,029,324 | 4/1962 | Couffer et al. | 417/470 UX |
| 3,139,156 | 6/1964 | Urso | 184/27 B |

*Primary Examiner*—David H. Brown
*Attorney, Agent, or Firm*—Hill, Gross, Simpson, Van Santen, Steadman, Chiara & Simpson

[57] ABSTRACT

A lubrication device employing a reciprocable plunger, as the actuating member, which is driven by a rotatable cam member through a pivoted rocker arm engaged with the plunger and having roller means engaging the cam, with the axis of the plunger, respective pivotal axes of the cam, arm and roller means, and line contacts between the roller and cam and between plunger and arm being so related that actuating forces are transmitted from the cam to the plunger substantially on the axis of the plunger, substantially eliminating undesirable lateral forces on component parts and enabling the use of simple bearing structures for the cam shaft. Operation is further improved by a novel disposition of valve means in the lubricant supply line.

2 Claims, 4 Drawing Figures

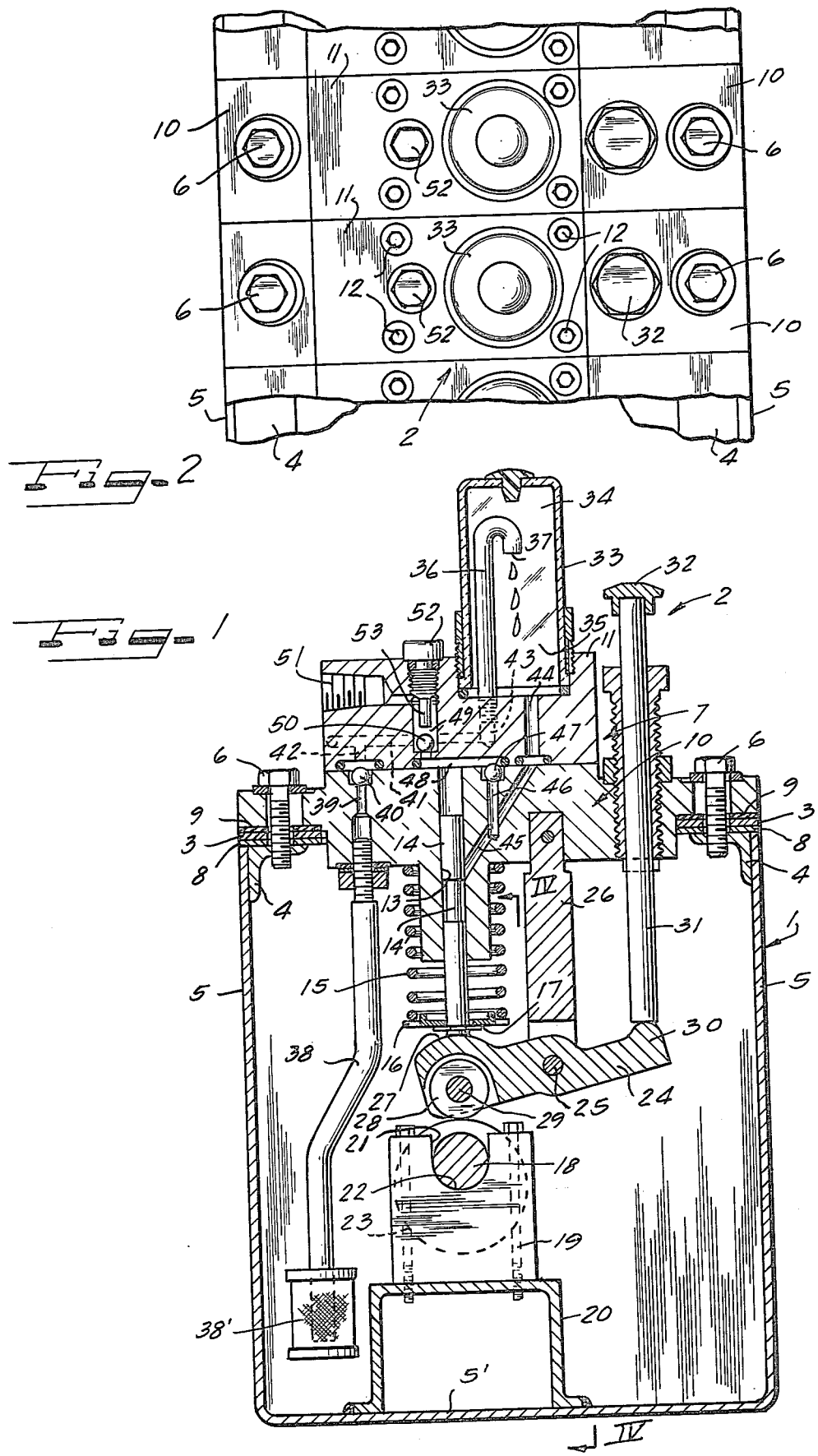

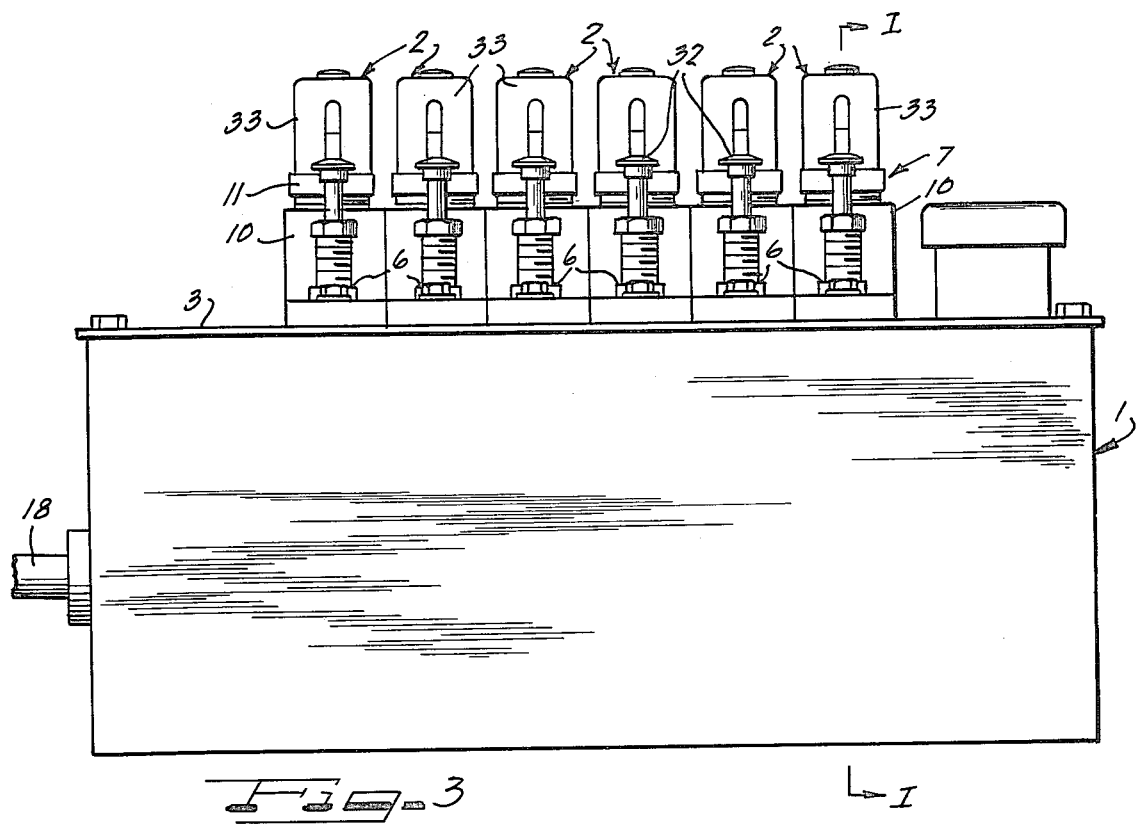
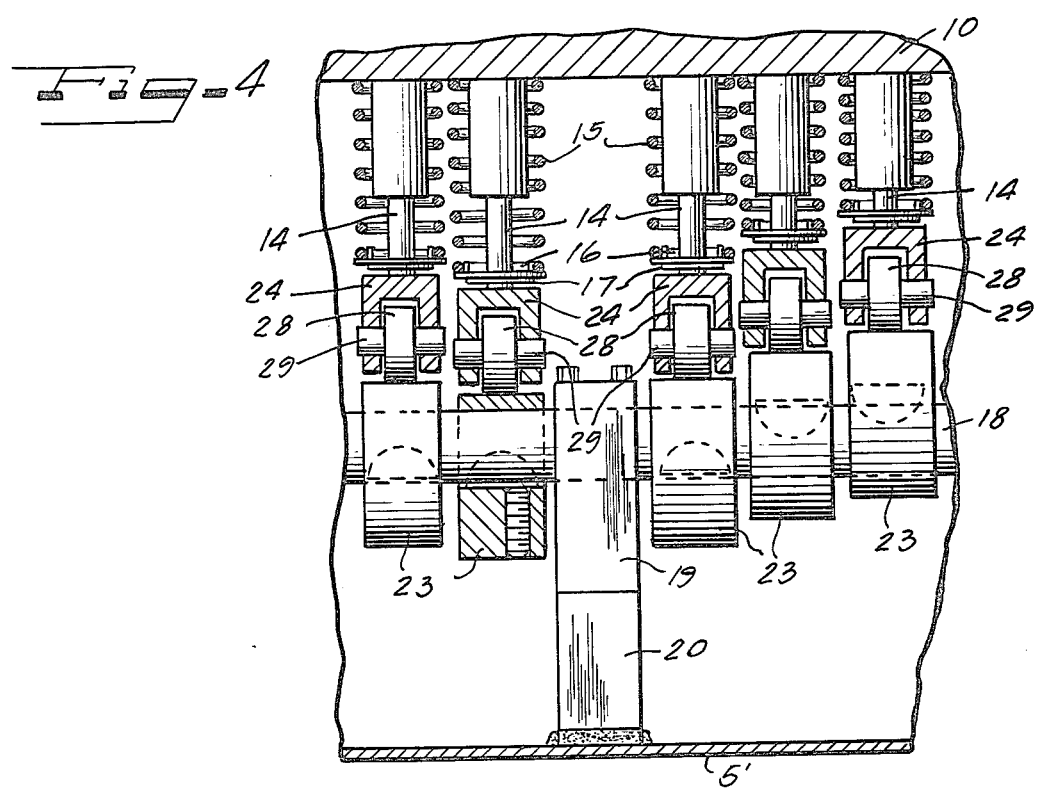

LUBRICATION PUMP

BACKGROUND OF THE INVENTION

The invention relates to a lubricator pump for effecting automatic or semi-automatic lubrication of various types of fabricating equipment, as for example, punches, dies and the like, eliminating manual swabbing and like operations as well as reducing lubricant consumption as the quantity of lubricant employed may be accurately adjusted to that necessary to achieve the desired results without the supply of excessive lubricant. In general, such type of pump structures employ a reciprocal piston or plunger, the stroke of which may be adjusted to the desired output requirements and it has been found that rotatable cam members form very simple yet efficient elements for driving the plunger, with the latter usually being returned to its initial position by suitable biasing means such as compression springs.

In many instances the plunger is operatively connected to the cam by a cam follower or rocker arm which is pivotally supported on an axis extending parallel to the cam shaft and is interposed between the cam and the adjacent end of the plunger to operatively connect the same. A typical example of such type of lubricator is illustrated in U.S. Letters Pat. No. 3,139,156, granted on June 30, 1974 to R.F. Urso. Follower arms of this type are employed in pump structures such as here involved for two purposes, the first being to reduce lateral thrust on the plunger which would otherwise exist if the plunger were seated directly on the cam, i.e. the follower arm providing a considerable reduction in lateral forces as it tends to transmit the cam movement more directly along the axis of the plunger. Second, the following arm may be so proportioned that the plunger may be actuated independently of the cam by suitable movement of the rocker arm, for example by a manual operation.

The factors relating to side thrust are of importance in the design of lubricator pumps as relatively very high pressures may be involved with respect to the discharge of the lubricant, pressures as high as 6000 psi not being uncommon. Consequently, lateral forces, which may be comparatively high, increase frictional loads both in the plunger and in the cam connections, and in addition may undesirably stress other elements of the structure as for example, pivot supports, cams and cam shafts, as well as the bearings for the latter.

As lubricator devices of this type may be designed to lubricate a plurality of points, for example, from 2 to 24, or more, a like number of pumps will be required, which are driven through respective cams, normally carried by a common cam shaft. In view of the possibly high pressures required, it becomes desirable to operate the individual pumps of an assembly sequentially, with the respective cams thus preferably being staggered as to their operating cycles, i.e. the high-low configuration of the cams are circumferentially staggered whereby full plunger actuation in pumping direction of the respective plungers will be distributed around one rotation of the cam shaft. However, where a plurality of pumping units are employed, particularly a large number, the individual plungers will be at various stages of an operational cycle whereby one plunger may be at the end of its pumping stroke, another at the end of its return stroke and the remaining plungers at various stages intermediate these two.

It will be readily appreciated that under such circumstances the production of relatively large lateral forces, particularly with respect to forces acting on the cam shaft, the latter may be subjected to forces acting in a plurality of different directions. In such event, undesirable flexing may take place in the shaft, i.e., a so-called rubber-banding effect, which in turn can impose severe stresses on the cam shaft bearings. The present invention therefore is directed to a reduction if not substantial elimination of these undesirable conditions.

It is quite common in pump structures such as here involved to employ suitable means for permitting a visual determination of the lubricating operation whereby the operator can visually ascertain the amount of lubricant that is being consumed. (Note sight feed of the patent referred to.) In the devices of this type a suitable sight feed chamber is provided in which the lubricant may pass, usually drop by drop, either downwardly from an inverted discharge tube or upwardly through a suitable clear sight fluid or the like. Where a sight-fluid is employed the lubricant is forced upwardly through the sight fluid, which has a specific gravity greater than that of the lubricant and thus remains in operating position, or in the event of the use of a drip tube, the lubricant is drawn to the pump cylinder, under the pump action during the return stroke of the plunger, whereby the sight chamber is under a partial vacuum. All of the various pumps employ suitable valve means, normally of ball-type, to control the admission of lubricant into the pump cylinder and discharge therefrom. This is also true of pumps employing a drip tube and a sight chamber under partial vacuum. Thus, valve means is normally disposed adjacent the inlet for lubricant into the pump cylinder with such valve opening on an intake or return stroke and closing on a pressure or discharge stroke. In like manner valve means is disposed between the pump cylinder and the discharge port of the pump, which will be closed during an intake or return stroke of the plunger, but open during a pressure or discharge stroke to permit the discharge of lubricant from the pump. It will be appreciated that in this construction, where a drip tube and sight chamber are employed, the intake stroke of the plunger must create a sufficient vacuum in the sight chamber and in the lubricant supply line thereto a draw lubricant to the sight chamber, this normally entailing elevating the lubricant from a reservoir, disposed below the pump structure, upwardly into and through the drip tube, from which it may drop into a well formed by the sight chamber and ultimately be received in the cylinder.

In some cases the plunger and cylinder structure simultaneously forms the valving means for controlling the entry of lubricant into the cylinder, the cylinder being so designed that the plunger is completely withdrawn therefrom during its return stroke, thus opening the cylinder to the lubricant supply and when the plunger re-enters the cylinder during its pressure stroke it automatically closes the cylinder to the lubricant supply.

In either case the supply line to the sight chamber as well as the sight chamber itself will normally have a partial vacuum therein, due in part to the height of the lubricant column extending from the reservoir up to the sight chamber, which must be continuously maintained. Any increase in the pressure within the sight glass, i.e., a loss in the vacuum, will result in some reverse flow in the supply line to the sight feed chamber which will thus affect the amount of lubricant entering the sight chamber on the next intake stroke or strokes. The invention therefore has among its objects, in addition to the improvement in the pump drive arrangement, the novel disposition of valve means in the lubricant supply line to the sight chamber whereby the vacuum produced by the column of lubricant therein is not transmitted to the sight chamber.

BRIEF SUMMARY OF THE INVENTION

The desired results are achieved in the present invention by the utilization of a pump construction in which a spring-biased plunger is reciprocated by a rotatable cam acting through a pivoted cam follower or rocker arm, with the follower arm carrying a cam-engaging roller and provided with an arcuate portion adapted to engage the adjacent end of the plunger. The axis of the cam shaft, the pivotal axis of the cam follower arm and the axis of the cam engaging roller are all disposed in parallel relation with the cam shaft axis, roller axis and line contacts between the cam and roller and between the follower arm and adjacent plunger end, all lying approximately in a common plane containing the axis of the plunger during the rotation of the cam and reciprocation of the plunger. If point contacts are involved between cam and roller or between plunger and follower arm they would correspondingly lie substantially in such common plane.

As a result of this construction, forces on the plunger derived from the cam action are transmitted substantially on the axis of the plunger with minimal lateral forces and, at the same time, the roller construction materially reduces lateral frictional forces between the cam and cooperable follower arm.

This construction results in substantially all forces on the cam shaft as a result of the cam operation likewise being in said plane and thus acting in a single direction on the cam shaft. Such single direction is substantially maintained with respect to the cam shaft irrespective of the cyclic point of engagement between the cam and the roller of the cam follower arm, i.e. the line contact between cam and roller will remain substantially stationary with respect to the axis of the cam shaft irrespective of the rotational position of the cam.

Consequently, as all forces on the cam shaft due to the cam action are in said plane, the corresponding forces on each of a plurality of cams will be in the common direction, eliminating transverse flexing forces and thus vibratory forces along the cam shaft.

At the same time, such common force direction enables the employment of very simple bearing structures along the cam shaft, as only the single force must be countered by the bearing structures. As a result, for example, merely half bearings may be employed, i.e. the bearing may be in the form of a notched block, with the notch being of a width to receive the cam shaft and having a semicylindrical complemental bottom surface on which the shaft is supported. Not only does such a construction materially increase the life of the related drive components but simultaneously therewith reduces costs, as well as enabling the cam shaft to be readily removed and replaced without requiring a bearing dismantling.

The construction also enables the utilization of a novel mounting structure for the cam shaft bearings, eliminating any bolt holes or other openings in the lubricant reservoir associated with the pump structure.

The invention also provides a novel lubricant supply construction to the pump cylinder, particularly where a sight feed is employed in connection with a pump structure in which the lubricant supply is drawn to the cylinder by an intake stroke of the pump plunger, in which check valve means is disposed in the supply line adjacent the sight chamber. Such check valve means prevents the supply column of lubricant extending between the lubricant reservoir and the sight chamber from creating additional suction forces in the sight chamber during the pressure strokes of the pump, thus improving the operation.

BRIEF DESCRIPTION OF THE DRAWINGS

In the drawings wherein like reference characters indicate like or corresponding parts:

FIG. 1 is a transverse sectional view through a single pump structure taken approximately on the line I—I of FIG. 2;

FIG. 2 is a top plan view of a pump structure such as illustrated in FIG. 1;

FIG. 3 is a side elevational view of a lubricating system employing a plurality of pump structures, such as illustrated in FIGS. 1 and 2; and FIG. 4 is a sectional view taken approximately on the line IV—IV of FIG. 1.

DETAILED DESCRIPTION OF A PREFERRED EMBODIMENT OF THE INVENTION

As illustrated in the drawings, particularly FIGS. 1 and 3, the lubricating device therein comprises a reservoir 1, for lubricating oil or the like, which is illustrated as supporting a plurality of pump structures 2, with the latter being mounted on a suitable cover plate 3. As illustrated in FIG. 1, the cover plate 3 is supported on flange members 4 carried by the respective side walls 5 of the reservoir and secured in place by suitable means, such as bolts 6, passing through bores in the pump body 7, with a suitable gasket 8 being disposed between the plate 3 and flanges 4 and a similar gasket 9 disposed between the mating faces of the cover plate 9 and the adjacent face of the member 7.

The pump body 7 is illustrated as constructed in two sections, a lower or base section 10 and an upper section 11, with the latter being secured to the base section 10 by suitable means such as cap screws 12.

As illustrated in FIG. 1, the base section 10 is provided with a cylinder 13 therein, in which is reciprocably disposed a piston or plunger 14, the lower-end of which extends from the section 10 and is urged in a downward direction by a compression spring 15, the upper end of which bears on the adjacent surface of the base member and the opposite end of which bears on a retaining washer 16 which is maintained in operative position at the lower end of the plunger 14 by a resilient lock ring 17. Disposed below the plunger 14, and having its longitudinal axis extending at right angles to the axis thereof, is a cam shaft 18, supported on a plurality of bearing blocks 19 which are rigidly secured to the bottom 5' of the reservoir 1 by means of respective, generally inverted, C-shaped channel members 20, the lower ends of which are welded to the bottom 5' with the associated block 19 in turn being bolted to the upper face of the channel. As illustrated in FIG. 1, the block 19 is provided with a notch or channel 21 therein, having a width substantially equal to the diameter of the shaft 18 with the bottom portion 22 of such channel being semicylindrical and complemental to the periphery of the shaft.

The shaft 18 carries a cam 23 for each pump structure with the cam illustrated likewise being cylindrical and eccentrically mounted on the shaft 18 directly below the plunger 14.

Each cam 23 is operatively connected to drive the associated piston 14 through a pressure stroke, i.e. in upward direction as viewed in FIG. 1, through a cam follower arm 24, pivotally movable on a pin 25 carried by a supporting block 26, rigidly secured to the base member 10, with the axis of the pin 25 and thus the pivotal axis of the arm 24 extending parallel to the axis of the shaft 18. The arm 24 is provided with a plunger-engaging face 27 on which the free lower end of the plunger 14 is seated and carries a roller 28 rotatable on a supporting pin 29 supported by the follower arm 24 with the roller 28 bearing on the surface of the cam 23.

In accordance with the invention the axis of the shaft 18, axis of the roller 28 and pivotal axis of the arm 24 all are disposed in parallel relation.

It will be noted that rotation of the shaft 18 and thus of the cam 23 will be transmitted to the arm 24 through the roller 28 to rock the arm 24 in a clockwise direction, thereby moving the plunger upwardly through a pressure stroke, following which, as the opposite side of the cam is reached, the arm 24 will rock in a counterclockwise direction to return the plunger 14 to the position illustrated in FIG. 1 under the action of the compression spring 15.

It will be particularly noted that the axis of the shaft 18 and of the roller 28 as well as the line contact between the roller 28 and cam 23 and between the arcuate surface 27 of the arm 24 and the adjacent end of the plunger 14, assuming such end to be substantially flat, all will lie substantially in a common plane which contains the axis of the plunger 14. As a result, all forces exerted by the cam to the arm 24 and by the latter to the plunger 14 are substantially unidirectional on the axis of the plunger with substantially little or no lateral stresses being transmitted to any of the components. In this connection, it will be noted that frictional forces between the cam 23 and arm 24 have been reduced to a bare minimum by the use of the roller 28 which provides a rolling connection between the cam and the arm 24 rather than a sliding connection. Likewise, very little sliding action takes place between the arcuate surface 27 of the arm 24 and the adjacent end of the plunger, with contact between the roller and cam and between the surface 27 and the adjacent end of the plunger lying in substantially the common plane throughout the movement of the respective parts.

It will be appreciated that, as high operating pressures may be involved, the forces on the various components are likewise correspondingly large and the forces on the shaft are concentrated in a downward direction to firmly maintain the shaft 18 in firm engagement with the bearing block and eliminating any need to provide caps for the bearings at the tops thereof. Thus, for each revolution of the cam 23, the plunger 14 will be reciprocated through an upward pressure stroke and returned with a downward intake stroke as hereinafter described in detail.

It may be desirable at times to actuate the plunger 14 manually, particularly in connection with flushing of the pump structure or priming thereof and this may be readily incorporated in the construction illustrated by provision on the arm 24 of an extension 30 which is adapted to be engaged by the lower end of a reciprocable push rod 31, carried by the base section 10 and provided with a knob 32, by means of which downward pressure may be applied to the rod 31 which in turn will pivot the arm 24 in a clockwise direction and move the piston 14 upwardly through a pressure stroke.

It will also be particularly noted that in view of the construction described, the block 26, supporting the arm 24, has substantially no forces acting thereon, particularly in a transverse direction as lateral stresses that might otherwise act on the block 26 have been eliminated. Consequently, the only forces involved on the block are those attendant to maintaining the arm 24 in proper alignment and in connection with its pivotal action about the pin 25.

The hydraulic system of the particular embodiment of the invention illustrated is particularly shown in FIG. 1, in which the top section 11 of the pump structure is provided with a transparent cup-shaped member 33 defining a sight chamber 34 having a lubricant well 35 at the bottom thereof. Disposed in the chamber 34 is a drip tube 36, having an inverted end portion with a downwardly directed discharge port 37. Lubricant is adapted to be conducted from the bottom of the reservoir 1 to the chamber 34 and through a downwardly depending supply tube 38, provided with a strainer 38' at its lower end, and secured at its upper end to the base section 10. The tube 38 communicates at its upper end with a passageway 39, in the section 10, provided at its upper end with a check valve in the form of a ball 40.

The upper section 11 is provided with passageway means in the form of a horizontally extending bore 41, communicating with the upper end of the passageway 39 through a vertically extending portion 42, with the opposite end of the horizontal passage 41 having a vertically extending portion 43 communicating with the lower end of the drip tube 36.

In like manner the section 11 is provided with a passageway 44 communicating with an angularly extending passageway 45 which is intersected by a vertically extending bore 46, at the upper end of which is provided a ball type check valve 47. The lower face of the section 11 is provided with a recess or channel 48 therein which forms a communicating passage between the passageway 46 and the upper end of the cylinder 13 whereby lubricant may flow from the sight chamber 34 through passageways 44, 45, 46 and check valve 47 to the upper end of the cylinder. Also communicating with the recess 48 is a vertically extending passageway 49 having a ball type check valve 50 therein, which passageway connects with an internally threaded discharge port 51 forming the outlet of the pump structure. As illustrated, the passageway 49 is closed at its upper end by a plug 52 having a downwardly depending stem 53 which forms a retaining stop for the ball valve 50. Communicating passages in the sections 10 and 11 are sealed at the juncture of the two members by respective O-rings, gasket plate, or the like, to ensure a fluid tight seal thereat.

In operation, assuming that the system is filled throughout with the lubricating fluid involved, the respective lines will be filled with such liquid, which also will accumulate in the well 35 at the bottom of the sight chamber 34, the remainder of the sight chamber being empty. Upon downward movement of the plunger 14 lubricating liquid will be drawn from the well 35 through passageways 44, 45, 46 around check valve 47 and into the upper end of the cylinder 14 to fill the volume displaced by the plunger, thus completing an intake stroke. During this intake of lubricating liquid, the check valve 50 will be seated and prevent any flow into the cylinder from the discharge bore 49 etc. Simultaneously with the withdrawal of liquid from the sight chamber 34, a partial vacuum will be created in the sight chamber which will be reflected in the supply line to the reservoir 1, whereby lubricating liquid will be drawn upwardly through the tube 38, around check valve 40 and through passageways 41, 42 and 43 into the tube 36 where it will be discharged from the inverted open end thereof into the sight chamber, thus replenishing the liquid withdrawn into the cylinder 13.

As rotation of the cam 23 continues, the plunger 14 will begin upward movement to apply pressure to the liquid in the upper end of the cylinder, thereby seating the check valve ball 47 and preventing a return flow into the sight chamber 34, while simultaneously opening the check valve 50 whereby lubricant will be forced out of the discharge outlet 51.

The presence of the check valve 40 in the lubricant inlet line, relatively closely adjacent to the sight chamber 34 eliminates the vacuum producing action of the column of lubricant in the tube 38 at the sight chamber 34 by effectively closing the inlet passageway thereto so that the liquid in the drip tube and associated passageways above the ball 40 have merely the forces of gravity acting thereon and exert no force with respect to a vacuum in the sight chamber 34. The result is that the tube 38, drip tube 36 and associated passageways all remain completely filled with liquid throughout the compression strokes of the plunger 14.

It will also be noted that the construction is such that no spring biasing of any ball valve is required, facilitating assembly and eliminating the additional parts and their cost.

In the embodiment illustrated, as will be apparent from reference to FIG. 1, the plunger 14 has an intermediate portion 14' of reduced diameter forming an annular chamber intermediate the ends of the plunger, which chamber, during a portion of the reciprocation of the plunger is in communication with the lower end of the angularly extending passageway 45 whereby the chamber 14' is constantly supplied with lubricating liquid, thereby ensuring a very efficient lubrication of the cylinder 13 and plunger 14 during operation of the pump structure.

It will be appreciated from the above description that we have provided a novel pump structure which is very efficient in overall operation both hydraulically and mechanically and which enables the use of relatively simple bearing structures for the actuating cam shaft of the device.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. In a lubricator device, the combination of a pump structure provided with a pump cylinder therein, having an open end, a plunger reciprocable therein and having a portion extending from said open end, means biasing said plunger in a direction toward said open end, said pump structure having means for supplying lubricant to the opposite end of said cylinder, and a discharge port communicating with such opposite end of the cylinder, and valve means for controlling lubricant flow to and from said cylinder, a cam shaft disposed in spaced relation to the free end of said plunger portion, with the axis of said shaft disposed normal to and intersecting the axis of said cylinder, a cam carried by said cam shaft, a cam follower arm pivotally supported for movement about an axis laterally spaced from and extending parallel to the axis of said cam shaft, said arm extending between said cam and said free end portion of the plunger and having an arcuate portion engaged with the latter, bearing members supporting said cam shaft at spaced intervals, each bearing member having a shaft-receiving notch therein which opens on the portion of the bearing member adjacent said arm, said notch having a semicylindrical bottom portion which is complemental to the external surface of said shaft, and a roller supported by said arm for rotation about an axis extending parallel to said shaft axis and engageable with said cam for actuation thereby, the axis of said roller and contacts between said cam and roller and between said arcuate surface and said free end portion of the plunger all lying approximately in a common plane containing the plunger axis, throughout rotation of said cam and reciprocation of said plunger.

2. A lubricator device according to claim 1, wherein said pump structure includes a receptacle, forming a reservoir for lubricating material, with said pump structure forming at least a part of the top closure therefor, at least one of said bearing members being supported on an inverted C-shaped channel member, the free end edges of the leg portions thereof being welded to the inner face of the reservoir bottom, and the associated bearing member being bolted to the external face of the intermediate portion of the channel member.

* * * * *